United States Patent
Cur et al.

(10) Patent No.: US 9,945,590 B2
(45) Date of Patent: *Apr. 17, 2018

(54) AIR CONDITIONER WITH SELECTIVE FILTERING FOR AIR PURIFICATION

(71) Applicant: Whirlpool Corporation, Benton Harbor, MI (US)

(72) Inventors: Nihat O. Cur, St. Joseph, MI (US); James C. L. Guarino, Kalamazoo, MI (US); James W. Kendall, Mt. Prospect, IL (US); Steven J. Kuehl, Stevensville, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 83 days.

This patent is subject to a terminal disclaimer.

(21) Appl. No.: 14/644,510

(22) Filed: Mar. 11, 2015

(65) Prior Publication Data

US 2015/0354871 A1  Dec. 10, 2015

Related U.S. Application Data

(60) Provisional application No. 62/010,088, filed on Jun. 10, 2014, provisional application No. 62/064,181, filed on Oct. 15, 2014.

(51) Int. Cl.
*B03C 3/12* (2006.01)
*B03C 3/36* (2006.01)
(Continued)

(52) U.S. Cl.
CPC .......... *F25B 39/00* (2013.01); *B01D 46/0023* (2013.01); *B01D 46/0028* (2013.01);
(Continued)

(58) Field of Classification Search
CPC .. B03C 3/12; B03C 3/36; B03C 3/455; B03C 3/45; B03C 2201/12; F24F 1/0007;
(Continued)

(56) References Cited

U.S. PATENT DOCUMENTS 3,139,020 A * 6/1964 Schemenauer ....... F24F 1/0007
                                                   165/249
3,500,738 A * 3/1970 Wenig ..................... F04D 25/10
                                                   392/382

(Continued)

FOREIGN PATENT DOCUMENTS

DE      3727672 C    7/1988
DE      3706220 C1   9/1988
(Continued)

OTHER PUBLICATIONS

International Searching Authority, "Search Report and Written Opinion," issued in connection with International Application No. PCT/US2015/035005, dated Oct. 22, 2015, 13 pages.
(Continued)

*Primary Examiner* — Frank Lawrence, Jr.
*Assistant Examiner* — Minh-Chau Pham
(74) *Attorney, Agent, or Firm* — Nyemaster Goode, P.C.

(57) ABSTRACT

A split air conditioner has a cabinet with a fan and evaporator for mounting within a structure. The cabinet includes a filter or a stacked filter system positioned in the flow path between an air inlet and an air outlet for filtering contaminants from the air. Movable dampers are provided for selectively changing the airflow path to selectively bypass the filter to provide a greater or lesser degree of filtration of the air. Preferably, the filter is a high performance HEPA-like filter having substantially less pressure drop.

21 Claims, 16 Drawing Sheets

(51) Int. Cl.

| | | |
|---|---|---|
| *B03C 3/45* | (2006.01) | |
| *F25B 39/00* | (2006.01) | |
| *F24F 1/06* | (2011.01) | |
| *F24F 1/48* | (2011.01) | |
| *B01D 46/00* | (2006.01) | |
| *B01D 46/30* | (2006.01) | |
| *F25B 49/00* | (2006.01) | |
| *F24F 1/00* | (2011.01) | |
| *F24F 1/38* | (2011.01) | |
| *F24F 1/56* | (2011.01) | |
| *F24F 1/10* | (2011.01) | |
| *F25B 39/02* | (2006.01) | |

(52) U.S. Cl.
CPC ......... *B01D 46/0032* (2013.01); *B01D 46/30* (2013.01); *F24F 1/0003* (2013.01); *F24F 1/06* (2013.01); *F24F 1/10* (2013.01); *F24F 1/38* (2013.01); *F24F 1/48* (2013.01); *F24F 1/56* (2013.01); *F25B 49/00* (2013.01); *F25B 39/02* (2013.01)

(58) Field of Classification Search
CPC ............... F24F 3/166; F24F 2001/0096; F24F 2003/1639; F24F 2001/0048; Y10S 55/10
USPC ...... 55/385.3, DIG. 10; 96/28, 74, 399–407; 95/73, 74
See application file for complete search history.

(56) References Cited

U.S. PATENT DOCUMENTS

| | | | |
|---|---|---|---|
| 3,618,659 A * | 11/1971 | Rawal | F24F 3/044 165/104.34 |
| 4,505,129 A | 3/1985 | Yamane et al. | |
| 4,538,425 A | 9/1985 | Ohishi et al. | |
| 5,564,626 A * | 10/1996 | Kettler | F24F 3/044 236/49.3 |
| 6,129,781 A * | 10/2000 | Okamoto | B03C 3/12 55/282.3 |
| 6,582,295 B1 * | 6/2003 | Abouchaar | B01D 46/0039 340/607 |
| 6,913,637 B2 | 7/2005 | Kim | |
| 7,266,971 B2 | 9/2007 | Kang | |
| 7,350,371 B2 | 4/2008 | Lee et al. | |
| 8,002,615 B2 * | 8/2011 | Jeong | B60H 1/00849 454/139 |
| 2001/0025501 A1 * | 10/2001 | Schmadl | B60H 1/00064 62/239 |
| 2002/0090907 A1 * | 7/2002 | Barber | B01D 46/0006 454/158 |
| 2002/0104330 A1 * | 8/2002 | Klingler | B60H 3/06 62/317 |
| 2002/0178695 A1 * | 12/2002 | Poirier | B01D 46/0004 55/320 |
| 2005/0284168 A1 * | 12/2005 | Lee | F24F 1/0007 62/317 |
| 2007/0074530 A1 * | 4/2007 | Ishii | F25D 13/067 62/407 |
| 2010/0043362 A1 * | 2/2010 | Okada | F24F 1/0007 55/296 |
| 2012/0137876 A1 * | 6/2012 | Miller | B01D 46/0043 95/23 |
| 2015/0075373 A1 * | 3/2015 | Miller | F24F 3/1603 95/15 |
| 2015/0224436 A1 * | 8/2015 | Klein | B01D 46/0002 55/421 |

FOREIGN PATENT DOCUMENTS

| | | |
|---|---|---|
| EP | 2423614 A1 | 2/2012 |
| EP | 2518418 A1 | 10/2012 |
| EP | 2597384 A2 | 5/2013 |
| JP | 61049943 A | 3/1986 |
| JP | 03036434 | 2/1991 |
| JP | H0634153 A | 2/1994 |
| JP | 11-276835 | 10/1999 |
| JP | 2000018646 A | 1/2000 |
| JP | 2000055424 A | 2/2000 |
| JP | 2005180768 A | 7/2005 |
| JP | 2005315531 | 11/2005 |
| JP | 2005315531 A | 11/2005 |
| JP | 2006002985 A | 1/2006 |
| KR | 0100176907 B1 | 10/1999 |
| KR | 20000046491 A | 7/2000 |
| KR | 1020050058136 A | 6/2005 |
| KR | 100626433 | 9/2006 |
| KR | 100626433 B1 | 9/2006 |
| KR | 0100715335 B1 | 5/2007 |
| KR | 0100715337 B1 | 5/2007 |
| KR | 1020090081913 A | 7/2009 |

OTHER PUBLICATIONS

International Search Report and Written Opinion, dated Dec. 3, 2015, 14 pages.

* cited by examiner

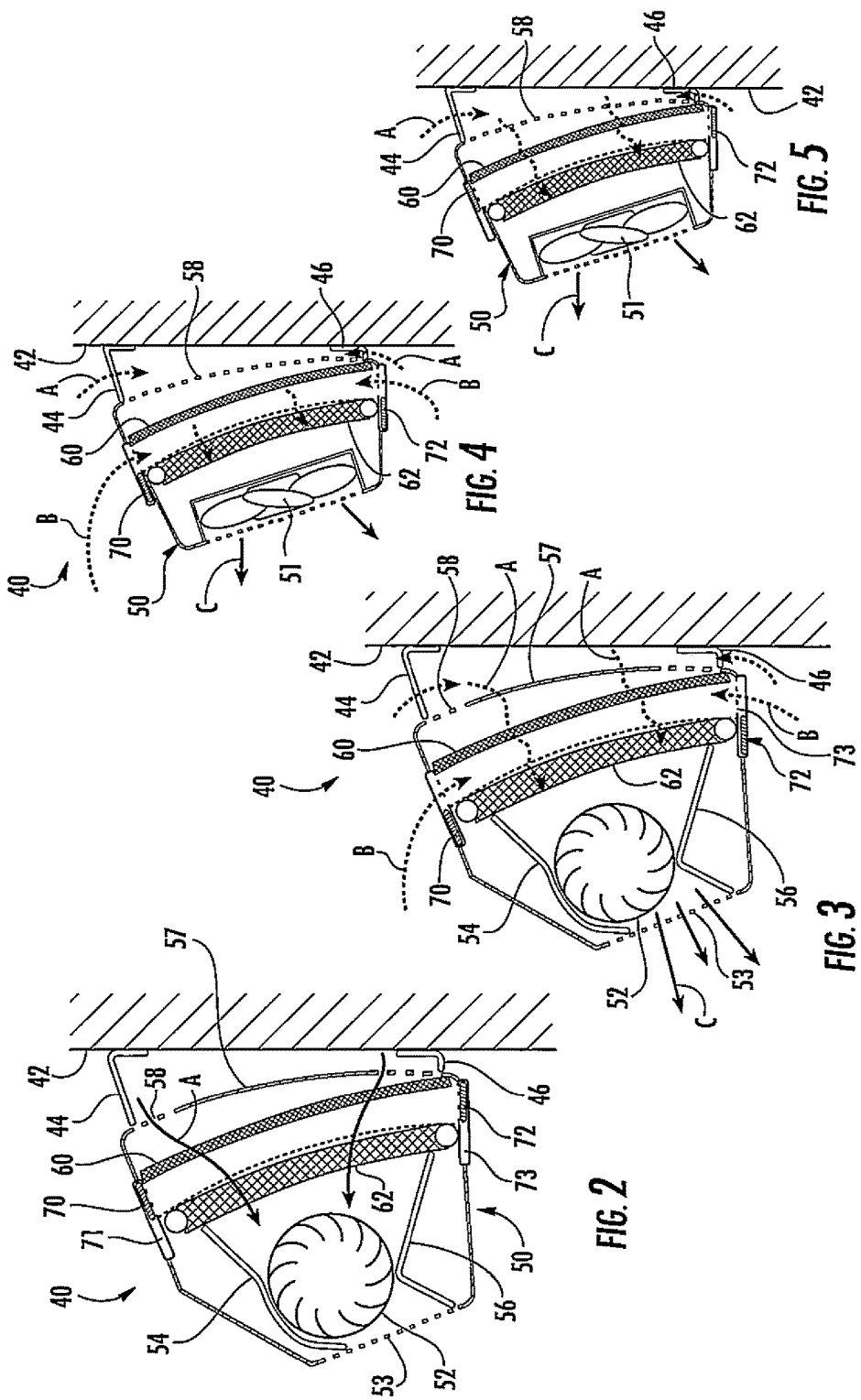

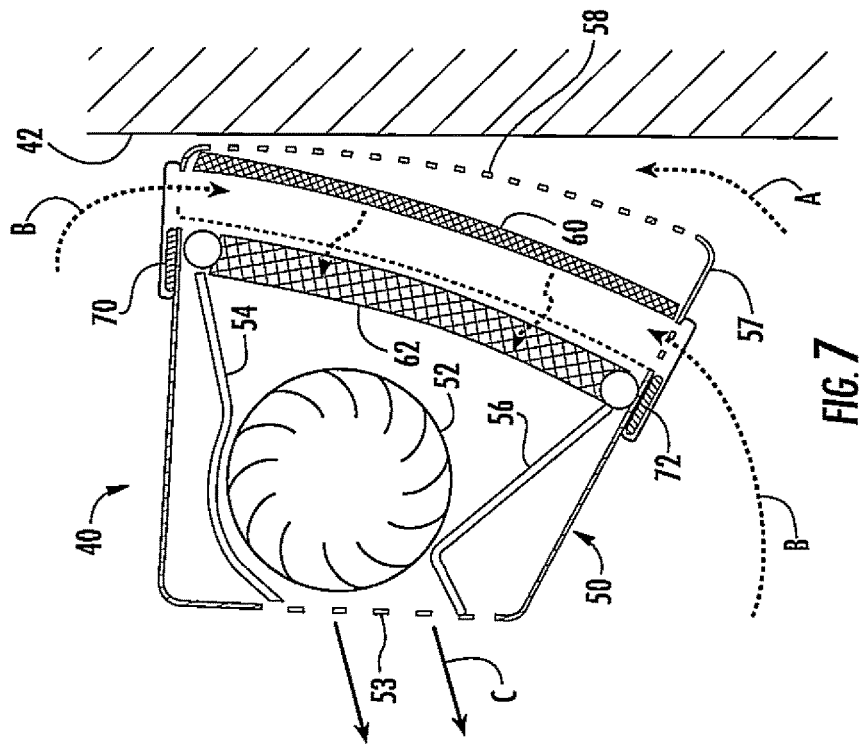
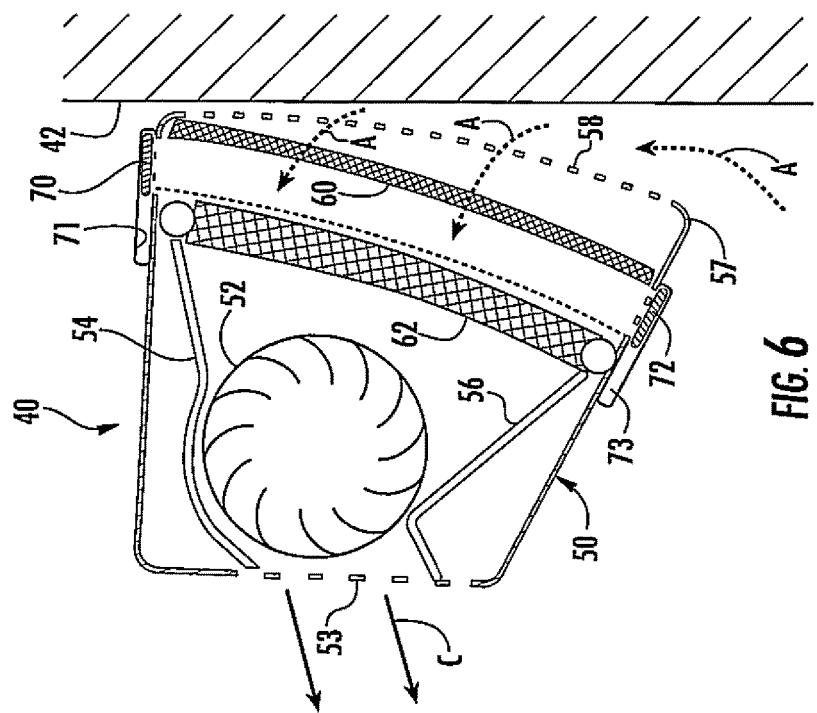

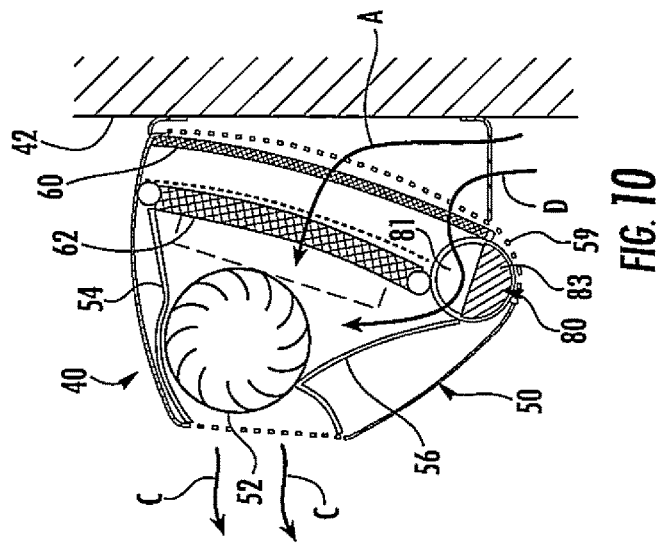
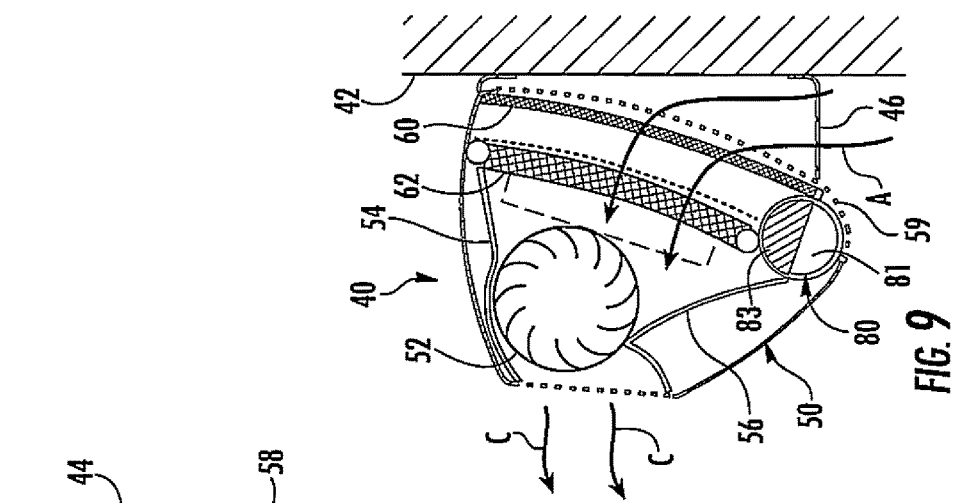
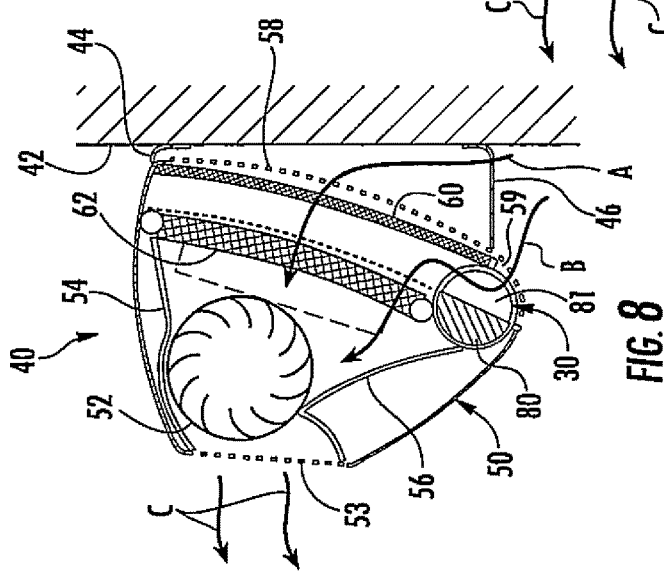

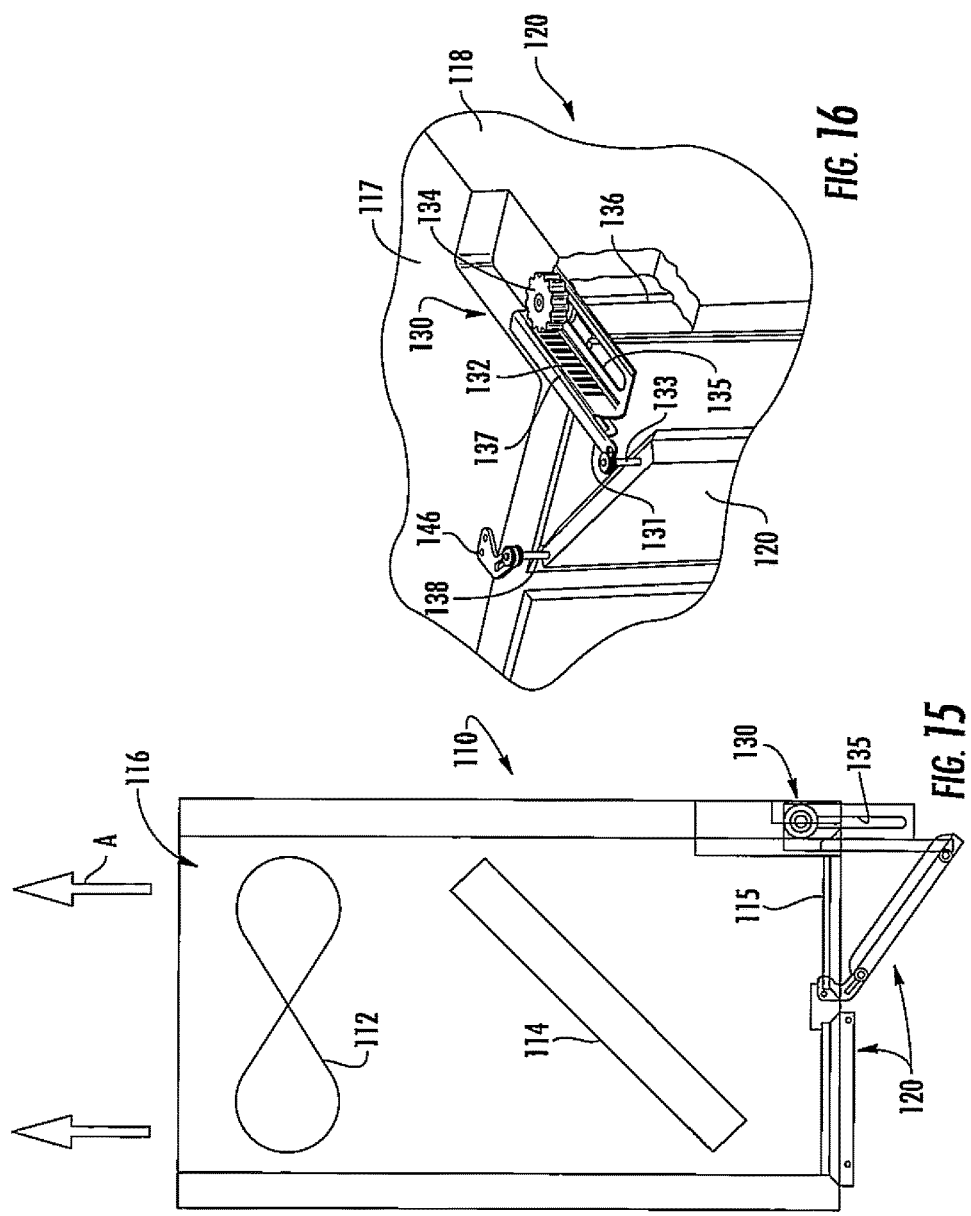

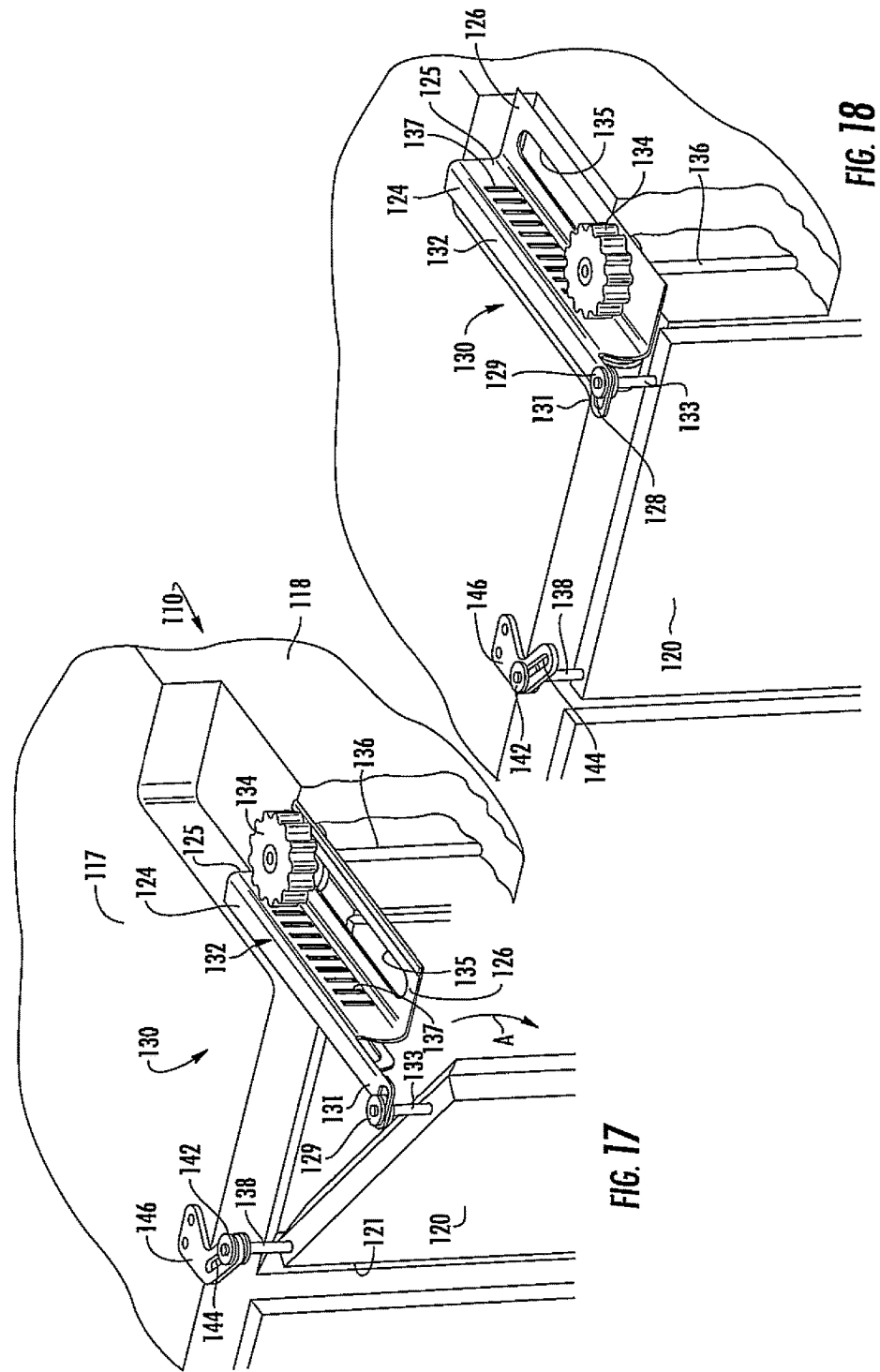

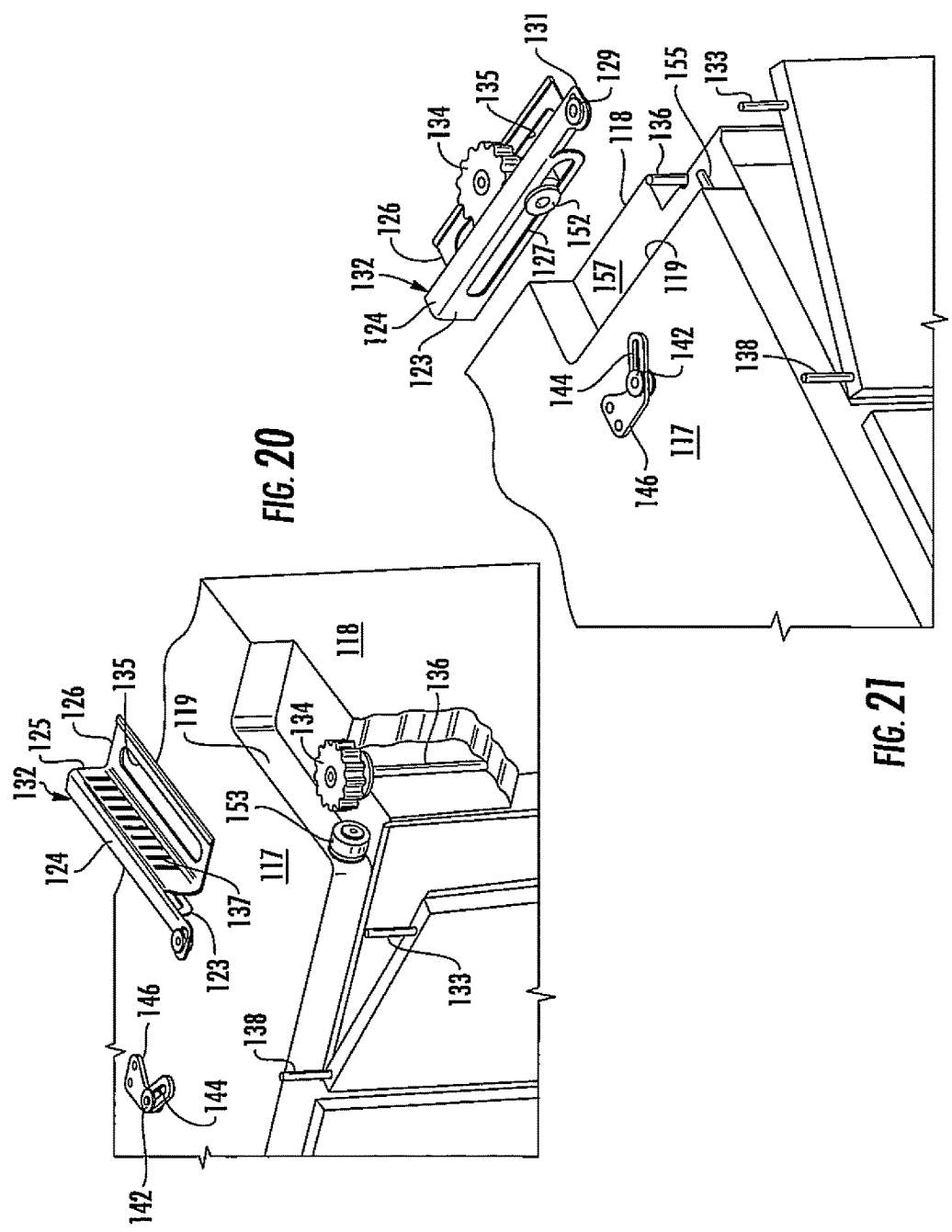

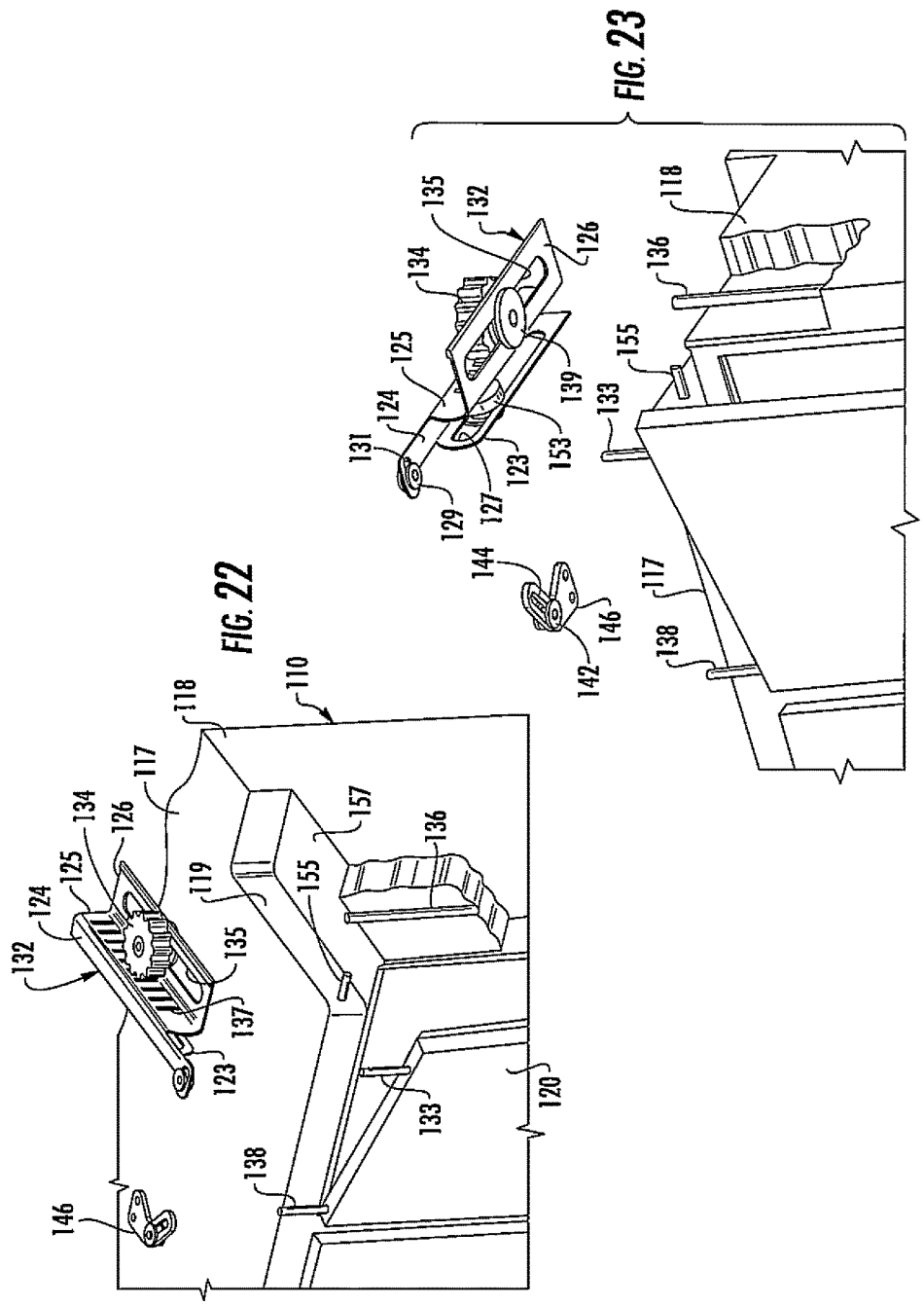

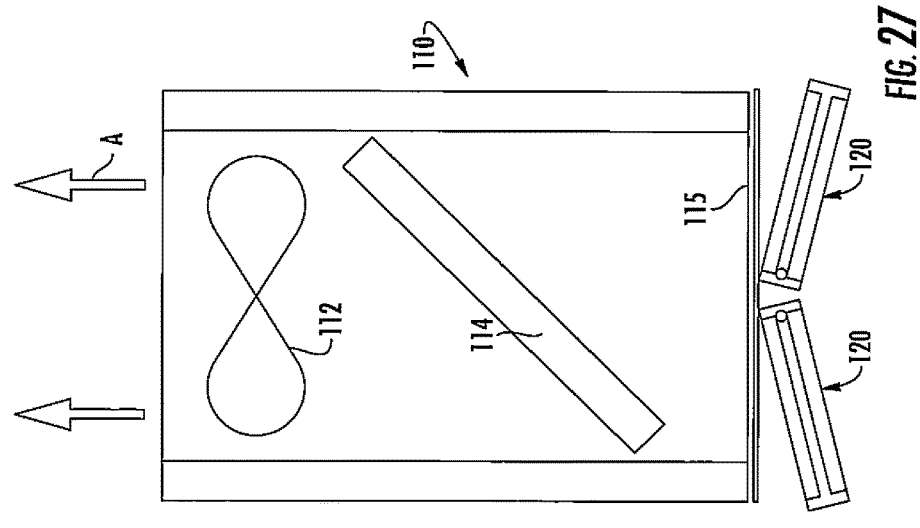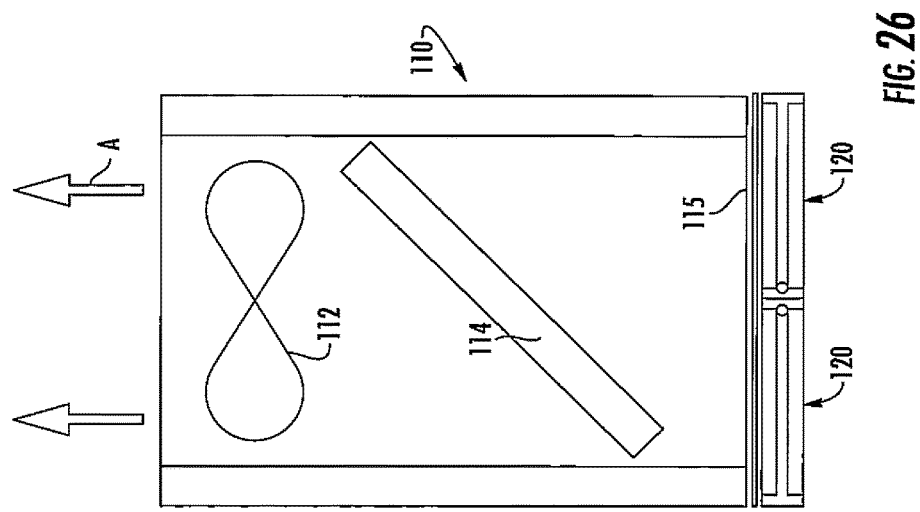

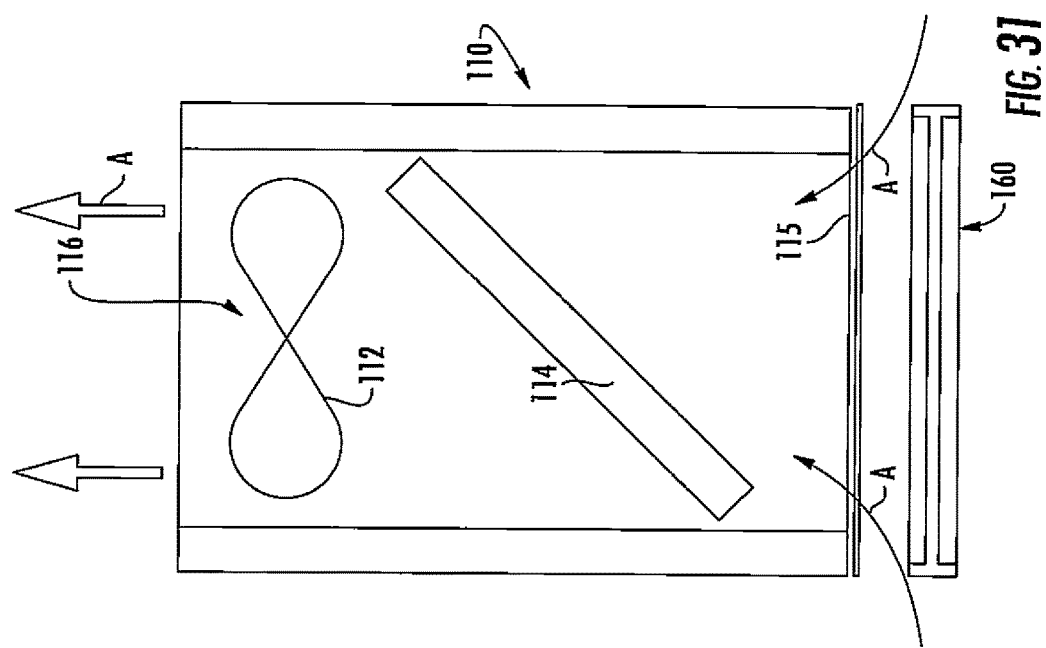
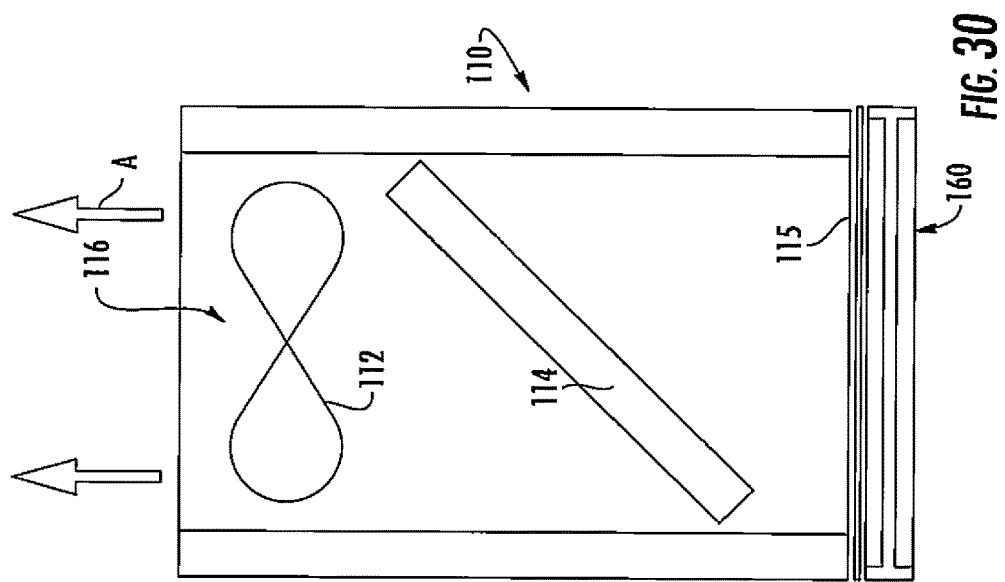

AIR CONDITIONER WITH SELECTIVE FILTERING FOR AIR PURIFICATION

CROSS-REFERENCE TO RELATED APPLICATIONS

This application claims priority under 35 U.S.C. § 119(e) and the benefit of U.S. Provisional Application Nos. 62/010,088 entitled SPLIT SYSTEM OUTDOOR AIR UNIT, filed on Jun. 10, 2014, by Nihat O. Cur and 62/064,181 entitled SPLIT SYSTEM AIR CONDITIONER/HEAT PUMP WITH DUAL HUB FAN CONDENSING UNIT AND ENHANCED COMPRESSOR COOLING, filed on Oct. 15, 2014, by Nihat O. Cur, et al., the entire disclosures of which are incorporated herein by reference.

BACKGROUND OF THE INVENTION

The present invention relates to a split system air conditioning system in which an evaporator component is positioned within a structure and is coupled to an external compressor/condenser unit and particularly to a cabinet enclosure for an evaporator which includes supplemental air filtration which can be selectively controlled by the user.

Split air conditioners are becoming popular for the use in individual areas of buildings, such as a bedroom or living room, where central air conditioning with universal duct work is either not available or unnecessary for living comfort. Split air conditioners typically include a wall-mounted indoor unit which includes an evaporator and a fan for cooling and dehumidifying air within a room. The indoor unit is coupled to an outdoor compressor/condenser unit for dissipating heat from the typically wall-mounted system. Such systems provide cooling frequently for a single room or multiple rooms, however, they do not provide substantial air purification by filtering or the like other than a simple screen filter which is not effective for removal of most pollutants.

Accordingly, it would be desirable to provide a split air conditioner system in which air filtering can be achieved and controlled by the user to provide a selectable amount of air filtration depending upon, for example, seasonal allergies to pollen or other allergens which may be present in the air and which it is desired to be filtered utilizing a split air conditioning system.

SUMMARY OF THE INVENTION

The system of the present invention accommodates this need by providing an air conditioner having a cabinet for mounting to the indoor surface of a structure. Additionally, this air conditioning unit could be free standing on the floor or surface. The cabinet includes a fan and an evaporator with an inlet for drawing untreated air into the cabinet, on one side of the evaporator, and an air outlet on the opposite side of the evaporator to provide conditioned air output from the cabinet.

In one embodiment of the invention, the cabinet includes a filter positioned in the flow path between the air inlet and the outlet for filtering contaminants from the air. In a preferred embodiment of the invention, movable dampers are provided for selectively changing the airflow path to either bypass or partially bypass the filter to provide a greater or lesser degree of filtration of the air. In the most preferred embodiment of the invention, the filter is a HEPA-performance like filter but without the substantial flow resistance associated with HEPA filters on the order of 50% or better reduction in flow resistance.

These and other features, objects and advantages of the present invention will become apparent upon reading the following description thereof together with reference to the accompanying drawings.

BRIEF DESCRIPTION OF THE DRAWINGS

FIGS. 2-7 are cross-sectional schematic views of air conditioning units with selective dampers for selectively controlling the airflow through a filter in the air conditioning unit;

FIGS. 8-10 are cross-sectional schematic views of an air conditioning unit employing a rotary damper for selectively controlling the airflow through a filter contained by the unit;

FIGS. 15-25 illustrate top, perspective, and fragmentary exploded views of a filter system in which the filters can be pivotally moved between operational positions where maximum filtering takes place to bypass positions in which a selectable amount of filtering is available;

FIGS. 26-27 are top schematic views illustrating the movement of the filters also seen in FIGS. 15-25;

FIGS. 30 and 31 schematically illustrate in a top plan view a sliding filter where, in FIG. 30, the filter is fully engaged for maximum filtration and, in FIG. 31, the filter is moved away from the air conditioner cabinet to allow filtered and unfiltered air to enter the cabinet for increased cooling;

DETAILED DESCRIPTION OF THE PREFERRED EMBODIMENT

Figure 1:
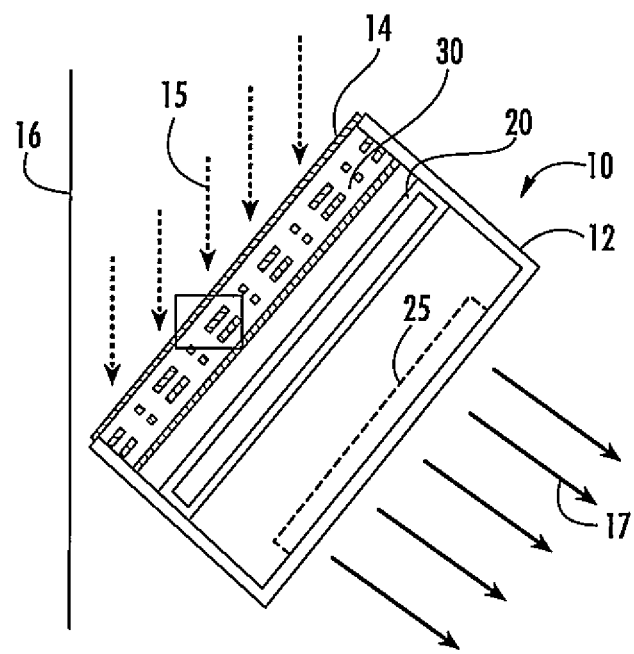
FIG. 1 is a schematic cross-sectional view of an air conditioning unit of the present invention, shown mounted in relationship to a wall for providing filtered and conditioned air to a living space.
Figure 1A:
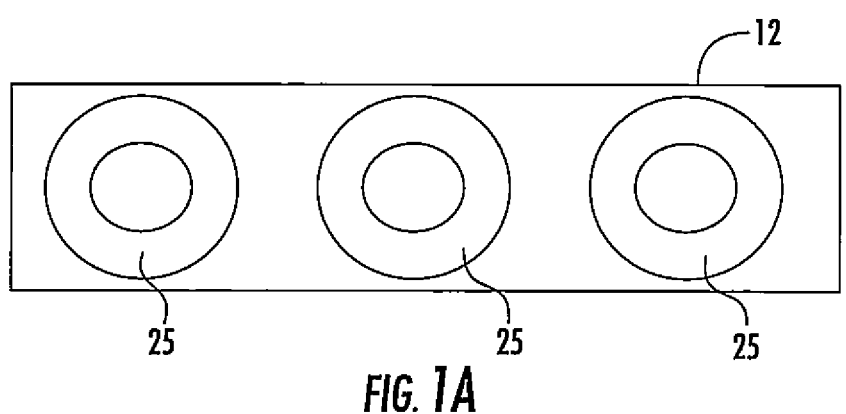
FIG. 1A is a front elevational view of the cabinet shown in FIG. 1.
Figure 11:
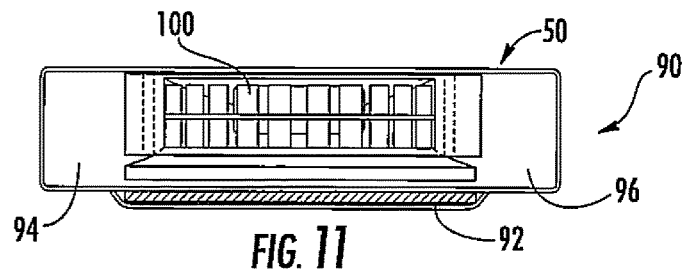
FIGS. 11-14 are top and front elevational views of alternative embodiments of the invention, where air is exhausted through spaced-apart air outlets on opposite edges of the cabinet.
Figure 12:
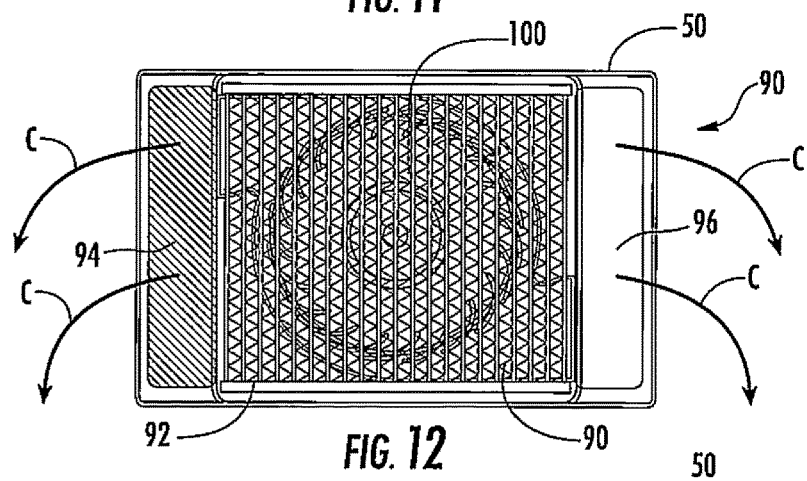

FIGS. 1 and 1A illustrate one embodiment of the present invention, in which a split air conditioning system includes an indoor air conditioner unit 10 with a cabinet 12, which has a rear air inlet grill 14 for receiving inlet air to be conditioned, as shown by arrows 15. The cabinet 12 is mounted to a support wall 16 of a building structure using suitable brackets. Within cabinet 12, there is positioned a micro channel or a fin-and-tube type heat exchanger which is a flat evaporator 20 conventionally coupled to an outside compressor/condenser unit for receiving a high pressure refrigerant liquid through a capillary tube or expansion valve fluidically coupled to the evaporator for cooling the input air 15 flowing through the air conditioner cabinet 12. As one possible illustration, three muffin-type fans 25 are mounted to the front of the cabinet 12 facing the interior of the room for exhausting treated air in the direction indicated by arrows 17. The cabinet further includes a filter unit 30 positioned between the inlet grill 14 and the evaporator 20 for purifying the air from contaminants, such as pollen, dust, and the like. In this embodiment of the invention, all of the input air 15 is not only conditioned for cooling and removing humidity but also filtered by the filter 30, which can provide close to HEPA-like performance but without the substantial pressure drop associated with HEPA filters. An example of such a filter could be 3M's HAF filter with ionizer, or a stacked filter combination with multiple filters for various pollutants such as viruses, hydrocarbons or other volatile organic compounds (VOC's), heavy metals, requiring filtration by activated charcoal or like, or Darwin's ifD® technology, etc. Filters in the system can be stacked in different combinations to create performance characteristics. Carbon, high air flow, HEPA, dust filters can be used in the air flow depending on the air characteristics needed.

In each of the embodiments described, the evaporator unit is coupled to the outside compressor/condenser utilizing conventional refrigerant fluid conduits for interconnecting the units. Similarly, the indoor evaporator system may include a drain for removing condensate that may have been collected during the cooling process. Additionally, a standard gross particle filter covers the air inlet side of the evaporator at all times during operation. Naturally, suitable electrical controls and connections are also provided. The schematic drawings illustrate the mounting of the indoor cabinet to structural walls, although the units can likewise be attached to the ceiling of a building in a conventional manner, or may be of the floor standing type popular in Asian markets.

Turning now to FIGS. 2 and 3, there is shown the indoor air conditioning unit 40 of a split system. Unit 40 is mounted to the wall 42 of a building utilizing conventional upper and lower mounting brackets 44 and 46. Unit 40 includes a cabinet 50 which typically will be an elongated rectangular cabinet similar to cabinet 12 shown in FIG. 1A. In the embodiment shown in FIGS. 2 and 3, however, an elongated cross-flow fan 52 is employed and is surrounded by upper and lower baffles 54 and 56 to funnel incoming air through an air inlet grill 58 through a filter or a filter 60 and the evaporator 62 in a direction indicated by arrows A in FIGS. 2 and 3. The fan discharges the conditioned and filtered air outwardly through outlet grill 53 adjacent the fan 52. The cabinet 50 includes movable guillotine-type dampers 70 and 72 slideably mounted within the cabinet and movable between the closed position shown in FIG. 2 and an open position as shown in FIG. 3. In the open position, supplemental air (indicated by arrows B in FIG. 3) can enter the cabinet 50 on the downstream side of filter 60, thereby bypassing the filter 60 to some extent. The guillotine dampers 70, 72 slideably fit along channels 71, 73 (FIG. 2) in cabinet 50 to selectively block or allow air in the direction of arrows B to bypass filter 60 and flow directly through the evaporator 62 depending upon the need for filtering incoming air, shown by arrows A in FIGS. 2 and 3. For such purpose, the mounting brackets 44, 46 provide clearance for the input grill 58 in the back wall 57 of cabinet 50 to allow input airflow which flows through filter 60 in both the FIGS. 2 and 3 configurations, although in the FIG. 3 configuration, less of the air is filtered. The dampers 70, 72 can be moved to positions intermediate that shown in FIGS. 2 and 3 to selectively control the amount of air that is filtered as desired. The exit air shown by arrows C in FIG. 3 represents the conditioned and filtered air drawn through the unit by fan 52.

FIGS. 4 and 5 have the same configuration as the units shown in FIGS. 2 and 3 except aligned muffin-type fans 51, such as shown in FIG. 1A, are employed as opposed to an elongated cross-flow fan 52. The remaining components of the FIGS. 4 and 5 embodiment are the same and use the same reference numbers.

FIGS. 6 and 7 show a unit 40 of the same general construction as the FIGS. 2 and 3 embodiment but mounted to receive air from below the unit 40 as opposed to from above as shown in FIGS. 2 and 3. Thus, the incoming air, represented by arrows A in FIG. 7, enters from the lower side of the unit 40, which carries the same reference numbers as the FIGS. 2 and 3 embodiment.

FIGS. 8-10 disclose another embodiment of the present invention in which a rotary damper 80 can be moved between three separate positions providing partially filtered air (FIG. 8), completely filtered air (FIG. 9), and filtered air which is not cooled by the evaporator (FIG. 10). Referring initially to FIG. 8, those components similar to the components shown in the previous figures employ the same reference numbers. In FIG. 8, the rotary damper 80 is mounted to the lower end 59 of an air inlet 58 in sealed rotatable engagement with the lower part of cabinet 50 and baffle 56. The damper 80 has an open pathway at section 81. Side 83 of the damper is enclosed and blocks airflow. In the position shown in FIG. 8, incoming air (shown as arrow A) enters through inlet grill 58 and flows through the filter 60 and evaporator 62 and is discharged, as indicated by arrow C, as cooled air. Additional air, shown by arrow B, flows through the open pathway 81 of damper 80 bypassing the filter 60 but flowing through the evaporator 62 and then combines to form the mixed filtered and cooled output air indicated by arrows C.

In FIG. 9, the damper 80 is rotated clockwise about 90° and, in connection with baffle 56, closes off the flow of air from inlet 59 through the damper 80. In this position, all the incoming air A flows both through the filter 60 and the evaporator 62, and none of the air bypasses the filter.

In FIG. 10, the damper is moved to a position rotated approximately 180° from that shown in FIG. 9. A new pathway, shown by arrows D, for the flow of air through the open section 81 of damper 80 bypasses the evaporator 62 completely but only after it has been filtered by filter 60. The remaining input air indicated by arrow A passes through both the filter 60 and evaporator 62 and combines with the unchilled air, shown by arrow D, exiting as shown by arrow C, as partially chilled but entirely filtered air. Thus, with the embodiment shown in FIGS. 8-10, three different modes of operation are possible.

In another embodiment of the invention shown in FIGS. 11-14, there is an indoor air conditioning unit 90 which can have a filter and baffle construction as in the prior embodiments to selectively filter the discharge air. In this embodiment, the inlet grill 92 receives air drawn through a filter and an evaporator into the center of centrifugal fan 100. The unit 90 has a pair of vertically extending rectangular outlet ports 94 and 96 on opposite sides of the cabinet 50. Conditioned and/or selectively filtered air is, therefore, distributed on opposite sides of the centrifugal fan 100, as illustrated by arrows C.

Figure 13:
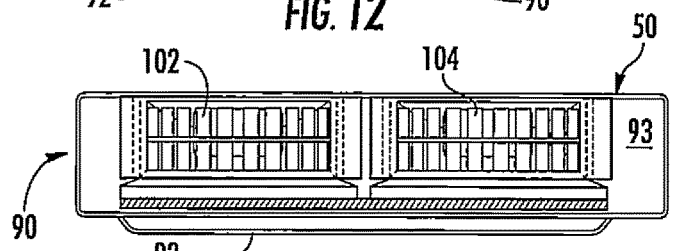
Figure 14:
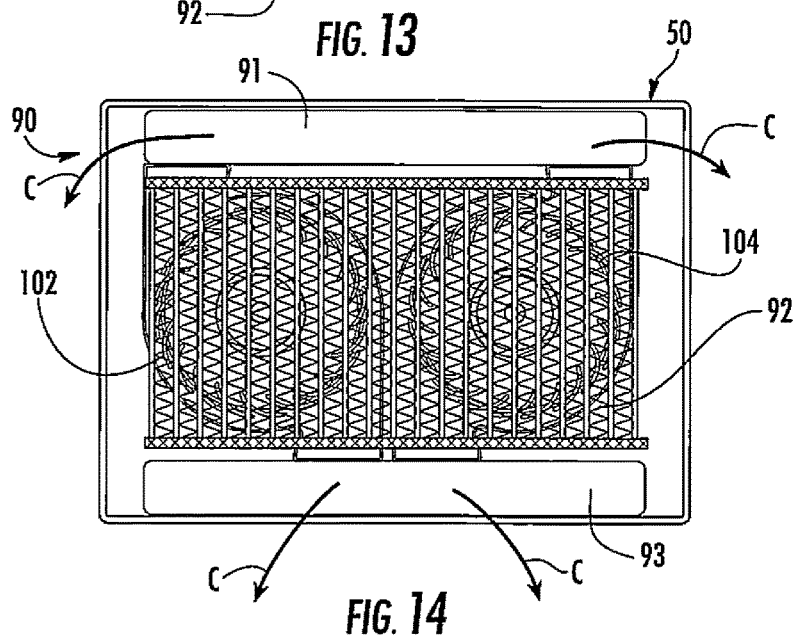
Figure 19:
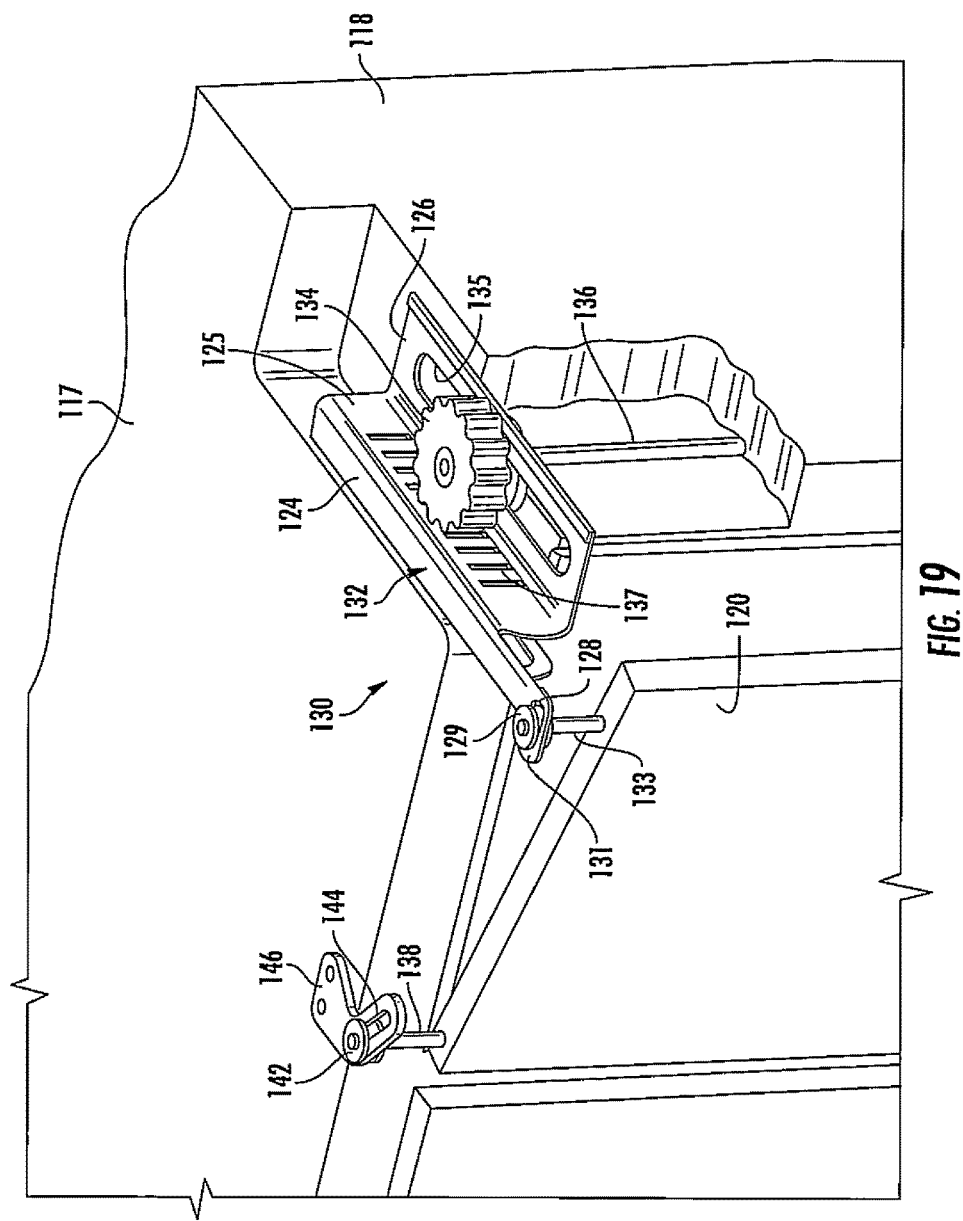

In the embodiment shown in FIGS. 13 and 14, a pair of spaced-apart centrifugal fans 102, 104 are employed to draw air into the cabinet through inlet grill 92. A pair of rectangular horizontally extending outlet ports 91 and 93 at the top and bottom of the cabinet 50 are near opposed edges of the cabinet, and the conditioned and selectively filtered air is exhausted, as shown by arrows C through outlet ports 91 and 93. In these specific embodiments, the presence of a centrifugal fan with higher pressure capabilities may allow the usage of higher pressure drop filter media which can come close to HEPA filter performance.

The FIGS. 15-25 embodiment of the invention provides a cabinet enclosure 110 for housing a fan 112 and an evaporator 114 with an air outlet 116 from the cabinet 110. The cabinet includes a standard gross particle filter 115 and a pair of movable filter assemblies 120 with the right-side filter assembly shown in detail, it being understood that the left-side filter assembly is substantially identical only with the parts reversed. The filter assemblies 120, as best seen in FIGS. 15-25, include a rack and pinion drive mechanism 130 including a sliding rack 132 movably supported on the cabinet walls 117 and 118 by the structure, as best seen in FIGS. 20-25. The rack 132 is driven by a meshing pinion gear 134 which engages the teeth 137 of the rack 132. Gear 134 is rotatably driven by a vertically extending drive shaft 136 coupled to a suitable drive motor. The end 131 of rack 132 is pivotally coupled by a roller follower 129 (FIGS. 17-19) which rides in a slot 128 in the end 131 of rack 132. Follower 129 is coupled to a pin 133 on filter 120 to allow pin 133 and follower 129 to ride in slot 128 as the filter 120 is moved, as best seen in FIGS. 17 and 18. The filter 120 can be the same type described above, namely, a 3M HAF filter. The filter 120 has the shape of a generally rectangular door-like panel with an edge opposite pivot pin 133 pivotally mounted to cabinet 110 at the top and bottom (only the top is shown, the bottom structure is substantially the same). The pivot connection to cabinet 110 includes a sliding pivot connection including a pin 138 which, as best seen in FIGS. 17 and 18, has a roller follower 142 that slides in a slot 144 of a bracket 146 secured to the upper wall 117 of cabinet enclosure 110.

The rack 132 includes a slot 135 which rides under the pinion gear 134 and is guided by a suitable bushing 139 (FIG. 23) mounted to drive shaft 136, such that, as seen in FIG. 18, when the drive gear of the pinion 134 rotates in a counterclockwise direction (as viewed from the top), the filter 120 is urged toward the open position shown in FIG. 17 by the pivot connection of the end of rack 132 to pivot pin 133 and pivot pin 138. As the door-like filter panel 120 moves to an open position, the pivot pin 138 slides within the slot 144 of bracket 146 to extend the inward edge 121 of panel 120 to an outward position clearing the cabinet enclosure 110 and allowing air to bypass the filter panel 120 and move in the direction indicated by arrow A in FIG. 17. Additional exploded fragmentary view of the components, including the bushings and roller guides for the rack and pinion assembly 130, are shown in the detailed fragmentary exploded perspective views of FIGS. 20-25.

Figure 24:
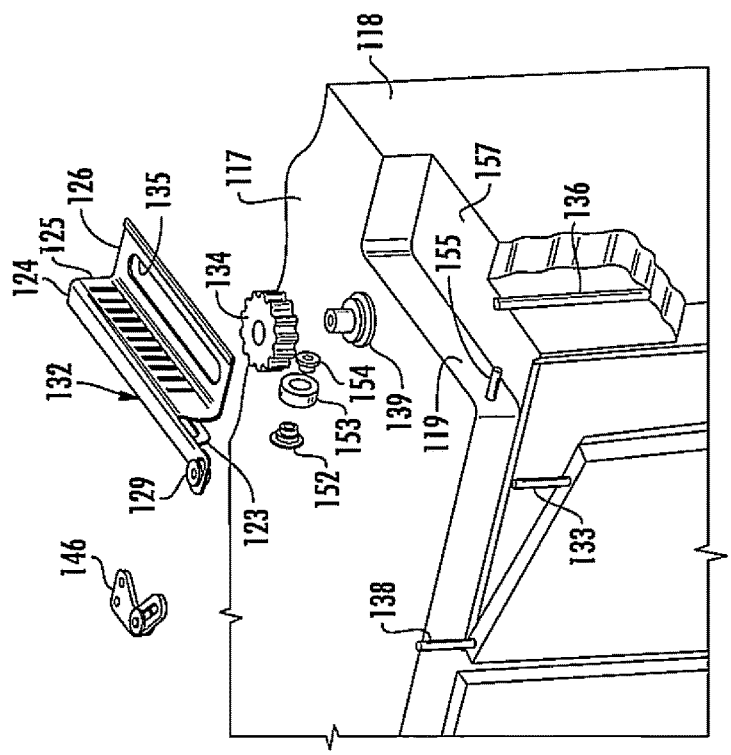
Figure 25:
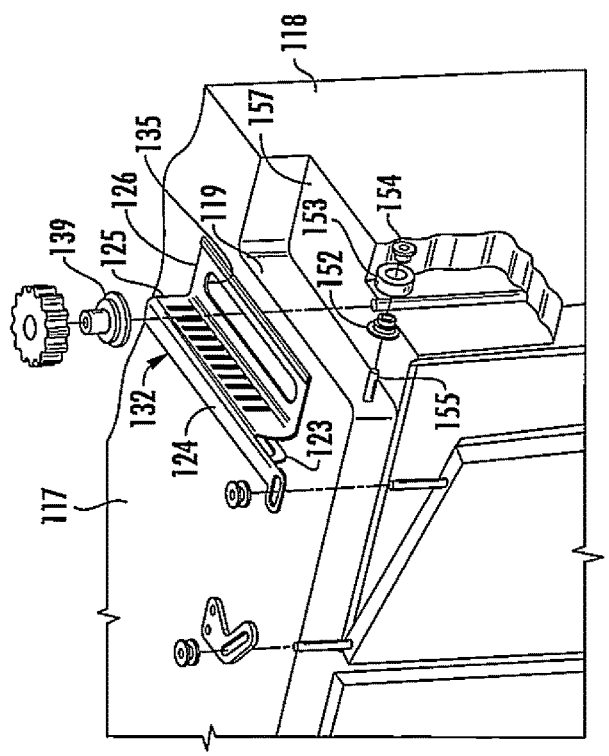

The rack 132 has a generally U-shaped configuration, as best seen in FIG. 23, including an inside vertically extending leg 123, a center horizontal section 124, an outer vertical leg 125, and the horizontally extending leg 126, which includes the slot 135. The gear teeth 137 are formed in the outer leg 125. In addition to being supported by bushing 139, rack 132 is also supported on the side wall 119 of a notch formed in the corner of top 117 of cabinet 110 by a roller bushing assembly including inner and outer bushings 152 and 154, as best seen in FIGS. 24-25, which surround a roller 153. Bushings 152 and 154 extend through slot 127 in leg 123, as best seen in FIGS. 21 and 23, and are rotatably mounted on an axle 155 extending from wall 119. Bushings 152 and 154 captively hold the roller 153 to the leg 123 of rack 132 adjacent side wall 119 while providing guided support with roller 153 engaging a surface 157 (FIGS. 21, 22, 24, and 25) of the cabinet 110. Thus, the rack 132 is supported in both vertical and horizontal planes by the axle 155 and drive shaft 136 for sliding movement when drive shaft 136 is rotated to which pinion gear 134 is attached by means of a suitable set screw or the like. This provides a smooth controlled movement of the rack 132 for opening and closing the filters 120 between positions shown in FIGS. 15-18, 26, and 27, as shaft 136 is rotated.

FIGS. 26 and 27 are schematic views of the filters 120 using the actuating structure shown in FIGS. 15-25. FIG. 26 shows the relative position of both of the filters 120 when fully engaged with the cabinet enclosure for the evaporator for maximum air filtration. FIG. 27 shows the filters 120 moved to a partially opened position for increasing the airflow through the evaporator to increase the cooling by the air conditioner and decreasing the filtration of air.

Figure 29:
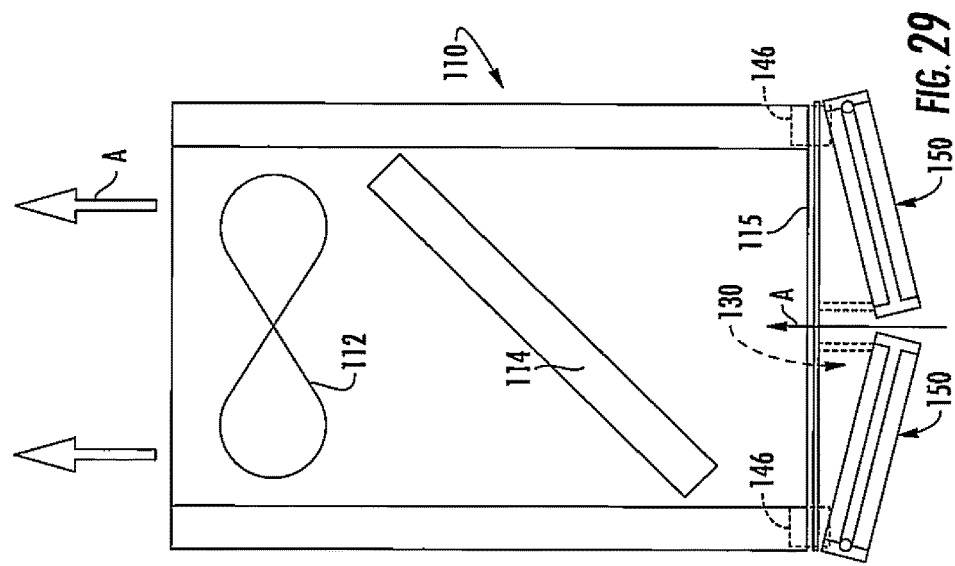
FIGS. 28 and 29 are top schematic views illustrating another embodiment in which filters pivot on a vertical axis on outside edges of an air conditioning cabinet.
Figure 28:
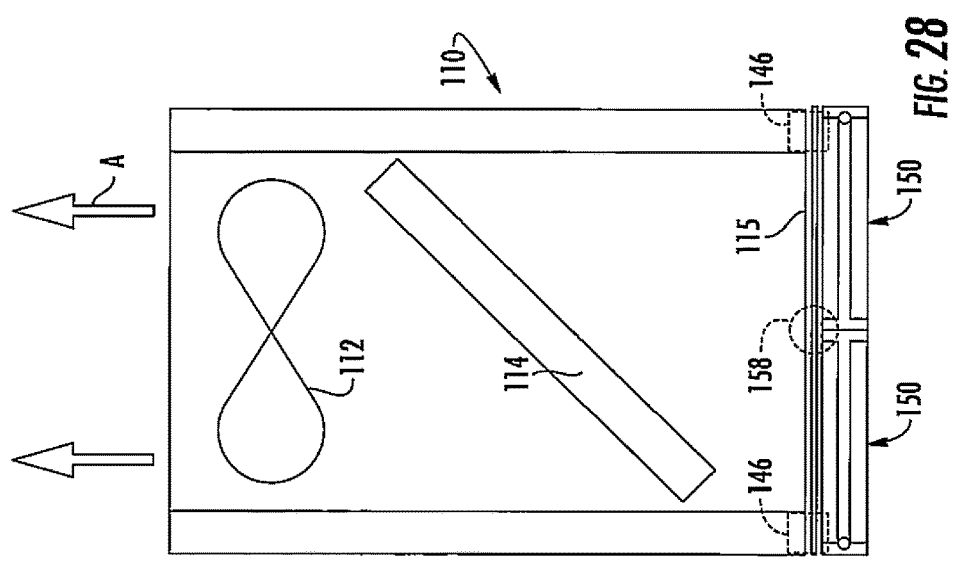

FIGS. 28 and 29 illustrate an alternative mounting of the filter moving mechanism shown in detail in FIGS. 15-25 to a pair of door-like filters 150 that pivot from the corners of the cabinet enclosure 110 instead of the center of the cabinet enclosure 110. In this embodiment, the rack and pinion mechanisms 130 of the prior embodiment are mounted in the center at area 158, as shown schematically at 130 in FIG. 29. In this embodiment, the pivot brackets 146 and associated structure of the prior embodiment are located in the corners as represented by 146 in phantom lines in FIGS. 28 and 29.

FIGS. 30 and 31 illustrate an alternative embodiment in which a single filter panel 160 is slideably mounted to move away from the inlet 116 of cabinet enclosure 110 between the position shown in FIG. 30, in which the filter is fully engaged to provide maximum air filtration for the system, to a position spaced from the outlet of the cabinet enclosure, allowing the air to bypass the filter in a direction indicated by arrows A in FIG. 31, with some airflow still being allowed through the filter 160. The sliding motion of filter 160 away from the cabinet can be accomplished with drawer-type slides driven by a rack and pinion mechanism similar to that of elements 130 in the prior embodiments or other conventional slide mechanism which extends between the filter 160 and the cabinet enclosure 110.

Figure 33:
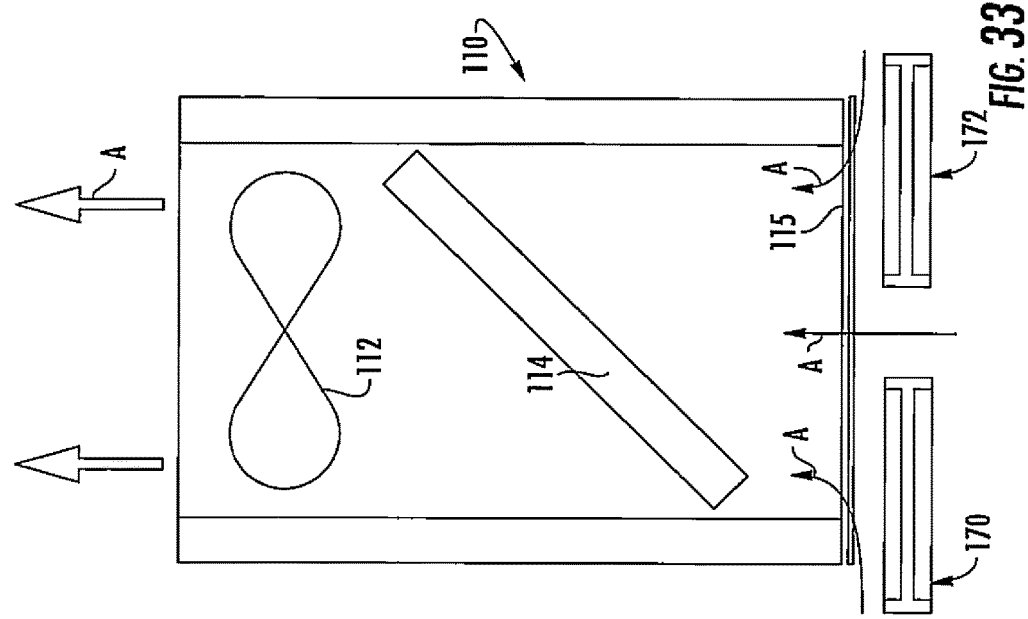
FIGS. 32 and 33 illustrate an alternative embodiment in a top plan and schematic view of a filter construction in which two filters both move away from the air conditioner cabinet and away from each other, as illustrated in FIG. 33, to allow filtered and unfiltered air to enter the cabinet.
Figure 32:
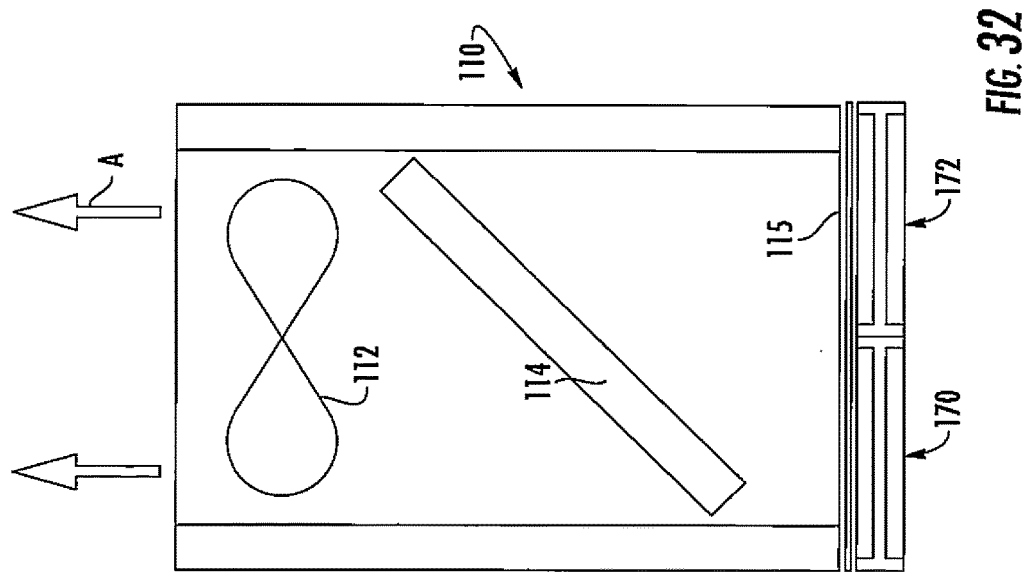

FIGS. 32 and 33 illustrate an alternative embodiment in which a pair of filters 170 and 172 are movable both away from the cabinet enclosure 110 and away from each other, as illustrated in FIG. 33, to provide an airflow path indicated by arrow A in FIG. 33, which extend between the filters as well as around the edges of the filter. Slide mechanisms, such as drawer slides, can be used for both directions of motion, and a rack and pinion drive mechanism similar to that of elements 130 in the prior embodiments can be used to control the movement.

Figure 34:
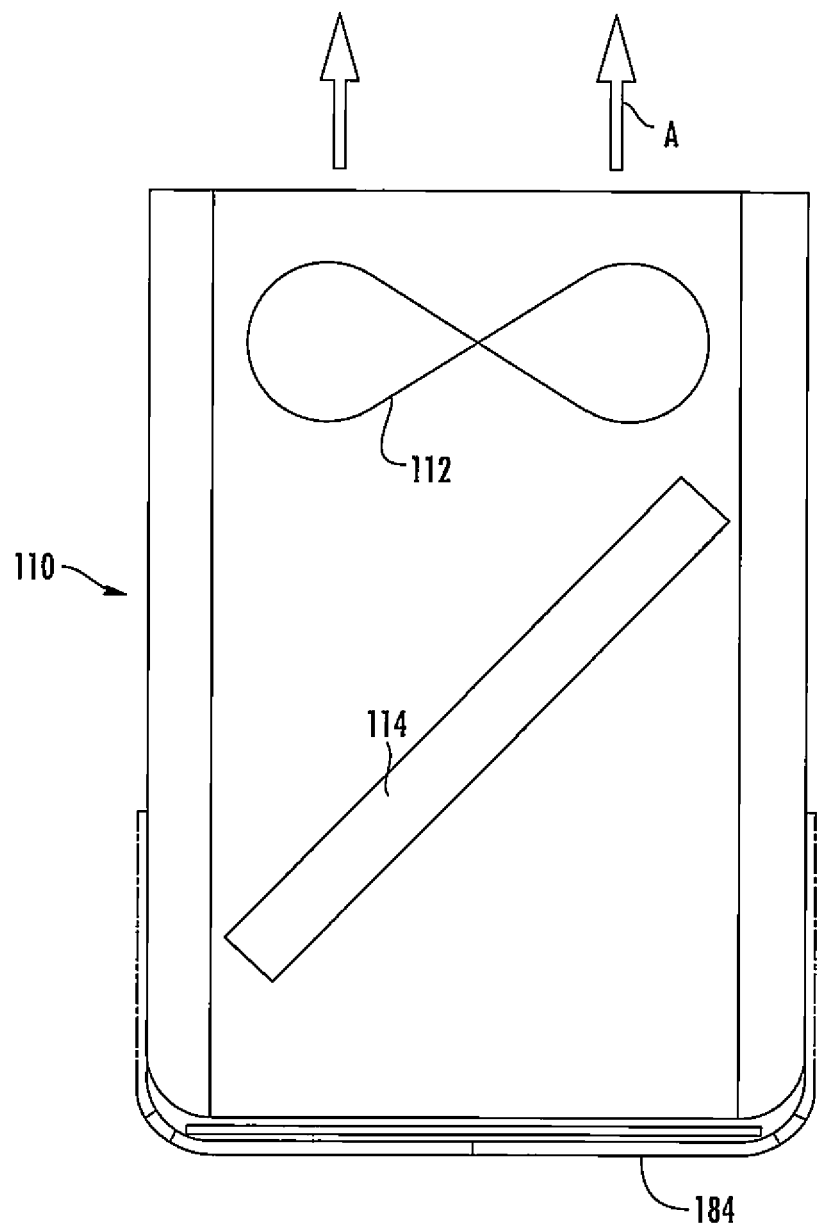
FIG. 34 illustrates in a top plan schematic view a filter construction which can be raised or rolled away, like a garage door, to vary the amount of filtration provided by the system.

Finally, in FIG. 34 there is shown a filter 180 which can be formed in segments similar to that of a garage door. For such purpose, the panels of the segmented filter 184 would be coupled to axles with rollers fitted within curved tracks on either side of the cabinet enclosure 110 and include a motor coupled to the filter to raise and lower the filter a desired amount for selectively changing the airflow through the filter and cabinet enclosure 110. For all the embodiments describe herein that provide for deployment of the filter into or out of the air flow stream it is possible to run the indoor air conditioning unit optimally either in air conditioning mode for cooling and dehumidification or without cooling and use as an air purification system or combined operation where cooling load might be low and the volume of airflow with the filter in full participation is the optimal user sought condition.

Selective positioning of the dampers (FIG. 1-14) or filers (FIGS. 15-34) can be done manually or with the control of electromechanical motor control systems. These systems can be controlled by the user of the system by manually moving the filters, with a wireless remote control adjusting a motor connected to the filters, or by a remote sensing and control. The remote sensor/control can evaluate the 'cleanliness' and desired air temperature and send the settings to the filter motor for adjustments as desired.

It will become apparent to those skilled in the art that various modifications to the preferred embodiment of the invention as described herein can be made without departing from the spirit or scope of the invention as defined by the appended claims.

The invention claimed is:

1. A split air conditioner system including an indoor mounted unit, the indoor unit comprising: a cabinet including a main air inlet and an air outlet; an evaporator positioned within the cabinet; a fan positioned in the cabinet for admitting untreated air into the cabinet and discharging conditioned air from the air outlet of the cabinet; a main filter positioned in the cabinet in a flow path between the main air inlet and the air outlet for filtering air; at least one secondary air inlet formed in the cabinet at a location between the main filter and the evaporator; and a damper positioned at the at least one secondary air inlet for selectively closing and opening the at least one secondary air inlet for selectively providing an airflow path bypassing the main filter.

2. The air conditioner system of claim 1, wherein the damper is a sliding damper.

3. The air conditioner system of claim 1, wherein the damper is a rotary damper.

4. The air conditioner system of claim 3, wherein the fan includes a centrifugal fan and the system further including baffles mounted in the cabinet to direct air through the evaporator.

5. The air conditioner system of claim 4, wherein the rotary damper is positioned in the cabinet to engage at least one of the baffles and is rotatable to three positions for admitting air through the at least one secondary air inlet for bypassing the main filter, for blocking air from the at least one secondary air inlet, and for allowing air from the main air inlet to bypass the evaporator.

6. The air conditioner system of claim 5, wherein the main filter is a high performance HEPA-like filter having substantially less pressure drop.

7. A split air conditioner system including an indoor unit, the indoor unit comprising: a cabinet; an evaporator positioned within the cabinet; one of a cross-flow fan, a centrifugal fan, or a muffin-type fan positioned in the cabinet; a main air inlet formed in the cabinet for drawing untreated air into the cabinet to allow the fan to move air from the main air inlet through the evaporator; an outlet for discharging air from the cabinet; one of a filter or a stacked filter positioned in the cabinet in a flow path between the main air inlet and the outlet for filtering air; a second airflow path between the evaporator and the one of a filter or a stacked filter; and at least one movable damper positioned in the cabinet for selectively changing an airflow path to selectively bypass the filter by allowing air flow through the second airflow path.

8. The air conditioner system as defined in claim 7, wherein the one of a filter or a stacked filter is a high performance HEPA-like filter having substantially less pressure drop.

9. An air conditioner for indoor mounting comprising: a cabinet for mounting to an indoor surface of a structure; a fan and evaporator positioned within the cabinet; an air inlet formed in the cabinet for drawing untreated air into the cabinet on a side of the evaporator to allow the fan to move air from the air inlet through the evaporator; a pair of parallel spaced-apart air outlets positioned on opposite edges of the cabinet for exhausting treated air into the structure; a filter positioned in the cabinet in a flow path between the air inlet and the pair of parallel spaced-apart air outlets for filtering air; and wherein the cabinet includes movable dampers for selectively changing an airflow path by either bypassing the filter or allowing air to flow through the filter.

10. The air conditioner of claim 9, wherein the pair of parallel spaced-apart air outlets are rectangular.

11. The air conditioner of claim 10, wherein of air outlets are vertically oriented on opposite sides of the cabinet.

12. The air conditioner of claim 10, wherein the pair of parallel spaced-apart air outlets are oriented horizontally at the top and bottom edges of the cabinet.

13. The air conditioner of claim 9, wherein the filter is a high performance filter.

14. A split air conditioner system including an indoor unit, the indoor unit comprising: a cabinet having a top, a bottom, a front surface, and a rear surface; brackets for mounting the cabinet to an indoor surface of a structure; an evaporator positioned within the cabinet; one of a cross-flow fan, a centrifugal fan, or a muffin-type fan positioned in the cabinet; a primary air inlet in the rear surface of the cabinet for admitting untreated air into the cabinet to allow the fan to move air from the primary air inlet through the evaporator; an outlet in the front surface of the cabinet for discharging conditioned air from the cabinet; a filter or a stacked filter system positioned in the cabinet in a flow path between the primary air inlet and evaporator for filtering air; a pair of secondary air inlets formed in the cabinet at the top and bottom and at a location between the filter and the evaporator; and a damper positioned at each of the secondary air inlets for selectively closing and opening the secondary air inlets for selectively providing an airflow path bypassing the filter.

15. The air conditioner system of claim 14, wherein the stacked filter system comprises one or more of an activated carbon filter, an HAF filter with an ionizer, an antiviral filter, a hydrocarbon filter, a VOC filter, or a dust filter.

16. The air conditioner system of claim 14, wherein the dampers are sliding dampers.

17. The air conditioner system of claim 16, wherein the filter is a high performance filter.

18. A split air conditioner system including an indoor unit, the indoor unit comprising: a cabinet having a top, a bottom, a front surface, and a rear surface; brackets for mounting the cabinet to an indoor surface of a structure; an evaporator positioned within the cabinet; a centrifugal fan positioned in the cabinet; a primary air inlet in the rear surface of the cabinet for admitting untreated air into the cabinet to allow the centrifugal fan to move air from the primary air inlet through the evaporator; an outlet in the front surface of the cabinet for discharging conditioned air from the cabinet; a filter or a stacked filter system positioned in the cabinet in a flow path between the primary air inlet and the evaporator for filtering air; a secondary air inlet formed in the cabinet at the bottom and at a location between the filter and the evaporator; and a rotary damper positioned at the secondary air inlet for selectively closing and opening the secondary air inlet for selectively providing an airflow path bypassing the filter.

19. The air conditioner system of claim 18, further including baffles mounted in the cabinet to direct air through the centrifugal fan.

20. The air conditioner system of claim 19, wherein the rotary damper is positioned in the cabinet to engage at least one of the baffles and is rotatable to three positions for admitting air through the secondary air inlet for bypassing the filter, for blocking air from the secondary air inlet, and for allowing air from the primary air inlet to bypass the evaporator.

21. The air conditioner system of claim 20, wherein the filter is a high performance HEPA-like filter having substantially less pressure drop.

* * * * *